Patented Dec. 29, 1953

2,664,451

UNITED STATES PATENT OFFICE 2,664,451

PROCESS OF DEHYDROGENATION

James R. Owen, Bartlesville, Okla., assignor to Phillips Petroleum Company, a corporation of Delaware No Drawing. Application October 24, 1949, Serial No. 123,301

18 Claims. (Cl. 260—680)

This invention relates to an improved method of dehydrogenating hydrocarbons. For example paraffins may be dehydrogenated to the corresponding olefins, usually in admixture with a small proportion of the corresponding diolefin. Or olefins may be dehydrogenated to the corresponding diolefins, usually conjugated. Thus the catalyst of the present invention is particularly applicable to effect the conversion of normal butane to a mixture of normal butenes and butadiene, but it is also effective in the conversion of cyclohexane to cyclohexenes and benzene, n-heptane to toluene, etc. For such a conversion the catalyst is preferably promoted with chromic oxide ($Cr_2O_3$, also known as chromium sesquioxide or as chromia). The alumina catalyst of the present invention is also very suitable for effecting the conversion of normal butenes to butadiene, especially when a minor proportion of magnesia is incorporated as a promoter during its manufacture.

This application is a continuation-in-part of my copending application Serial No. 634,767, filed December 13, 1945, now Patent No. 2,499,675.

The principal object of the present invention is to provide an improved process for dehydrogenation of hydrocarbons, particularly paraffins to olefins and/or diolefins, and of olefins to diolefins. Other objects of the invention will become apparent from the accompanying disclosure.

It is known that, in the preparation of activated alumina by dehydration of such materials as precipitated alumina gel and from minerals such as bauxite and gibbsite, the activity of the dehydrated alumina depends on proper control of the dehydration temperature. For example, alumina prepared by dehydrating bauxite at about 1000° F. is an active catalyst for dehydration, dehalogenation, dehydrogenation, etc., whereas anhydrous alumina prepared by dehydrating hydrous alumina above 2200° F. is comparatively inactive catalytically. Although the effect of dehydration temperature on activity of dehydrated alumina is not completely understood, it is believed that treatment at or above 2200° F. effects an intermolecular rearrangement the result of which is a form of alumina having a relatively low surface area per unit weight.

Commercially available activated alumina is often prepared by dehydrating minerals such as bauxite and gibbsite at about 1000° F. For example, alumina trihydrate is calcined to a moisture content of 8 to 10 per cent and then compressed into pellets, and the pellets are calcined to remove the balance of the combined water. Pelleted activated alumina prepared in this manner has a surface area of about 110 to 150 square meters per gram, measured by gas adsorption at low temperatures. In practice, the preparation process is usually not closely controlled; the chief control criterion is the suitability of the activated alumina for the intended use.

I have now found that a markedly superior alumina catalyst may be prepared by the steps of (1) calcining hydrated alumina containing at least 28 per cent by weight of combined water under conditions such that it is only partially dehydrated, namely to an extent such that the calcined material contains between 20 and 26 per cent of combined water, (2) compressing the resulting finely-divided material into pellets and (3) calcining the resulting pellets at a high temperature and under such conditions as to remove the residual combined water or water of hydration.

*Raw material for catalyst preparation*

As the raw material for the manufacture of the catalyst of the present invention, I may use any suitable form of hydrated alumina containing 28 per cent by weight or more of combined water. The preferred raw material for making the catalyst of the present invention is that form of alumina trihydrate which is formed as a by-product in the Bayer or Fickes-Sherwin process for the precipitation of alumina from alkali aluminate aqueous solution. This material is formed as a scale on the precipitating tanks. It is obtainable from the Aluminum Company of America and is the raw material used in the manufacture of "Activated Alumina." For a more detailed description of this material, attention is directed to U. S. Patents to Barnitt 1,868,869 and Derr 2,015,593. This material has the chemical formula $Al_2O_3 \cdot 3H_2O$ and is very pure. It may be termed an artificial gibbsite.

Less desirably, I may employ naturally occurring materials such as those varieties of bauxite or gibbsite which contain combined water in the neighborhood of 28 to 35 per cent. Generally speaking such natural aluminas are believed to be of the trihydrate type, that is to contain a major proportion of alumina trihydrate, $Al_2O_3 \cdot 3H_2O$. However, it is to be understood that the invention is not to be limited by any theoretical considerations and the principal criterion as to the suitability of the raw alumina is that it contain 28 per cent or more by weight of combined water. This figure is of course independent of any free water which can be removed readily by simple drying at say 220° F.

While I prefer to use alumina trihydrate obtained as a by-product in the manufacture of metallic aluminum, and may somewhat less desirably use naturally occurring alumina trihydrate such as bauxite or gibbsite containing 28 per cent or more of combined water, I do not wish to exclude from the present invention the use of synthetically prepared alumina trihydrate prepared for example by precipitation of alumina gel followed by drying to the trihydrate.

Whether by-product, natural or synthetically prepared, the hydrated alumina employed as raw material in carrying out the present invention is preferably in granular form. In size it may range from 100 mesh up to lumps as large as 4 to 5 inches. As received from the Aluminum Company of America, by-product alumina trihydrate formed as scale in precipitation tanks was of 40 to 100 mesh in size of particles. Apparently it has been ground prior to shipment. The size of the original material is not particularly critical as long as it is not so large that dehydration is not uniform due to difficulty of removing liberated water or to poor heat penetration into the interior of the granules during the relatively short partial dehydration step.

Partial dehydration step

In the first step of making the catalyst, the hydrated alumina is heated under conditions controlled to produce partially dehydrated alumina which, when ignited to constant weight at about 2200° F., undergoes a weight loss of 20 to 26 per cent. In other words, the calcination is so controlled that the resulting material retains between 20 and 26 per cent of combined water. Since the weight loss on ignition is the chief control criterion in this step, the partial dehydration procedure may vary somewhat in different specific embodiments of the invention. It is preferred to conduct this step at a temperature of about 480° F. A temperature as low as 470° F. ranging to as high as 490° F. may be employed in this step. Rather close temperature control during this step is important since temperature rather than time is the principal factor in determining the extent of water removal. However, it will be understood that other conditions including time are so adjusted that combined water is removed only to the extent specified.

Provision should be made for removing the water liberated during the partial dehydration step. If desired, the moisture may be removed as soon as formed by passing a current of gas over or through the material undergoing calcination. The natural draft in an ordinary rotary kiln is often adequate for this purpose.

In the case of by-product alumina trihydrate formed as scaly deposit in the precipitation tank where alumina is precipitated from alkali aluminate solution, a preferred procedure comprises heating the material in a gas-fired rotary kiln at about 480° F.

While I do not wish to be limited by theoretical considerations, nevertheless it may be that the partial dehydration step serves to remove one molecule of combined water from the alumina trihydrate present in the starting material, thereby converting the alumina trihydrate content of the initial material to the dihydrate form. It will be understood that the original alumina trihydrate may contain a minor proportion of impurities so that even after drying to remove any free water it may not be 100 per cent pure alumina trihydrate. This may serve to explain why the partially dehydrated material may contain as low as 20 per cent of combined water whereas pure alumina dihydrate, $Al_2O_3 \cdot 2H_2O$, would contain 26 per cent by weight of combined water. However, it is to be understood that the present specification fully discloses the actual steps employed in the practice of the present invention and accordingly that the invention is not dependent upon the accuracy of the foregoing speculations. For instance, the existence of a compound having the formula $Al_2O_3 \cdot 2H_2O$ is subject to some doubt. Regardless of whether the compound alumina dihydrate exists or not, I have discovered that the steps outlined herein produce the results described and have given details sufficient to enable those skilled in the art to practice the invention.

Following the partial dehydrating step, the material is allowed to cool in any suitable way and is now ready for the second step. The cooling may be effected in any usual way, for example, by allowing it to stand in any suitable atmosphere until its heat has been dissipated. The cooling should be carried out in such a way that re-hydration of the material does not occur. Ordinary cooling does not cause such re-hydration.

Pelleting step

In the second step of the catalyst preparation the partially dehydrated alumina is compressed into pellets. This operation is well known and need not be described in detail. It is variously known as pilling, pelleting, or tableting. In essence it amounts to subjecting a suitable mass of powdered material to such high pressure that it retains its shape after release of the pressure and discharge from the pilling machine. Pills or pellets of any desired shape or size can be manufactured. Usually, however, the pills are not larger than ¼ inch by ¼ inch.

Final calcination

The pelleted alumina is then calcined under conditions such that the residual combined water is removed. While this may be done in any suitable way, I find it preferable to conduct this operation at a temperature ranging from 900° F. to 1200° F. In exceptional cases a temperature as high as 1300° F. may be employed, but results are not as satisfactory as when a temperature not over 1200° F. is employed. Temperatures ranging from 1200° F. to 1300° F. injure the catalytic activity of the material and preferably are avoided. Temperatures above 1300° F. are even more injurious and are never employed.

In a typical and preferred embodiment the pellets are calcined at about 1000° F., other conditions being such that the residual combined water is completely removed.

Pelleted alumina product

Pelleted alumina made in the foregoing manner is characterized by superior properties. It has a surface area of the order of 250 square meters per gram which is about twice that of activated alumina pellets hitherto commercially available which are made by dehydrating the alumina trihydrate to a combined water content of from 8 to 10 per cent, pelleting, and calcining the pellets to remove the rest of the combined water.

On account of the unusually large surface area and possibly for other reasons not yet known with certainty, pelleted alumina prepared in accordance with the process of the present invention is a superior catalyst, especially for the dehydrogenation of paraffins to the corresponding olefins and/or diolefins.

Alumina prepared in accordance with the present invention may be employed either directly as a catalyst or as a catalyst ingredient with improved results. Thus a promoter for the alumina may be incorporated in any suitable way during manufacture of the pelleted alumina. Or the finished pellets may even be impregnated with a promoter or a compound convertible to a promoter. If desired other catalytic materials or materials convertible to catalysts may be incorporated during preparation of the pellets or even after preparation. Thus alumina prepared according to the principles of the present invention may be employed as a catalyst support.

Although activated alumina prepared in accordance with this invention is especially desirable as a dehydrogenation catalyst or as a component of a dehydrogenation catalyst, it is not limited thereto but may be used wherever activated alumina catalysts have been used heretofore. Thus it may be employed as a catalyst or catalyst ingredient for cracking, dehydration, polymerization, dehalogenation, cyclization and for any other catalytic processes where a superior activated alumina catalyst or catalyst component is desirable.

Grinding step

In many cases the partially dehydrated material is ground before the pelleting step. This may be conducted in any suitable manner and equipment, for example in a ball mill. It is preferably a fine grinding operation. The grinding is carried out dry, that is without the addition of water. Provision may be made for recycling coarse particles to the grinding step for further grinding. The material leaving the grinding zone may be used directly in the pelleting step or may be sieved to any desired size, oversized particles being returned.

The extent of particle size reduction in the grinding step is variable within wide limits and depends primarily upon the particle size of the original material, the duration of the grinding and the particle size desired in the product. Purely as an example, where 40 to 100 mesh by-product alumina trihydrate obtained from the Aluminum Company of America is used as the original material, the partially dehydrated material may be ground to an extent such that approximately one-third passes through a 300-mesh sieve. The material may be ground to any other suitable fineness such as 90 per cent through a 200-mesh sieve or 90 per cent through a 325-mesh screen.

Grinding and pelleting lubricant

If desired, a lubricant for the grinding and/or the pelleting operation may be introduced to the material to be ground or undergoing grinding. In the case of a lubricant added primarily for facilitating the pilling step, it may be added at any time sufficiently prior to the end of the grinding step that intimate incorporation is effected. When the lubricant is employed to facilitate the grinding step, it is preferably added ahead of the grinding step or in the early portion of this step. Examples of suitable lubricants are graphite, hydrogenated oils such as hydrogenated corn oil, peanut oil, cottonseed oil, and the like, soaps such as aluminum stearate, etc., resins which may be natural or synthetic such as rosin, hydrogenated rosin, ester gum, polymerized rosin, etc. It is preferred to employ a lubricant which is destroyed during the calcination of the pellets. An advantage of organic compounds as lubricants is that they initiate binding forces upon calcination of the pilled or tableted material and thus impart strength to the finished catalyst so that breakage and dusting are minimized. Also the lubricant speeds up the grinding and pilling steps and prevents unduly rapid wear of the equipment employed for these steps. The amount of lubricant employed may vary from a trace up to approximately 10 weight per cent of the material being ground.

Use of promoter

It is often preferred to incorporate a promoter for the alumina during preparation of the pelleted alumina catalyst. A dry powdered promoter, or compound yielding a promoter upon final calcination, may be added before or during the grinding step as disclosed in my copending application Serial No. 607,884, filed July 30, 1945. Such a material may be admixed with the ground partially dehydrated alumina prior to the pelleting. For example, a promoter oxide such as chromic oxide and/or magnesia may be incorporated with the alumina prior to pelleting. Other promoters or compounds forming same upon calcination may be employed, such as magnesium hydroxide or carbonate, or beryllium oxide, hydroxide or carbonate. Other catalytic compounds or elements which may not function as promoters but rather as true catalysts may similarly be incorporated. These include metals and metal compounds as well as non-metallic catalysts, such as silica.

Alternatively, the pellets of alumina may be impregnated with a solution of a promoter such as an aqueous solution of chromium trioxide, or with a solution of any other substance desired to be incorporated in the finished catalyst. Upon calcination of the pellets in the third step of my process to remove the residual combined water, any water derived from the impregnating solution is removed and at the same time the chromium trioxide or other compound is converted to the form desired in the finished catalyst.

General

The alumina prepared according to the process of the present invention is entirely in the gamma form. No beta and no alpha alumina can be detected by X-ray analysis.

A possible partial explanation for the unexpectedly high surface area and catalytic activity of pelleted alumina prepared in accordance with the present invention is that by pilling the alumina when it is only partially dehydrated, the combined water serves as a cushion or space-filler in the pilling step so that upon complete dehydration of the pills, additional surface is formed with the result that the resulting pellets have much greater surface area than do pellets prepared by dehydration of alumina to a lower moisture content, then pilling, and then calcining to remove the residual water. This is by no means a complete explanation. Although it is the best explanation now known to me, it does not serve to explain why calcination to a combined water content of between 20 and 26 weight per cent is critical. It is to be understood that the invention is not limited by any such explanation.

Dehydrogenation process

Catalysts of the invention are particularly advantageous in the dehydrogenation of hydrocarbons. While the alumina may be utilized without the incorporation of other dehydrogenating catalysts therein, composites containing one or more additional dehydrogenating catalysts are desirable in many instances. Metal oxides known to have dehydrogenating activity include the oxides of Cr, Mo, U, W, V, Mn, Zr, Th, Ti, Be, Mg, and Cu. Some of the metals themselves function desirably in the dehydrogenation of hydrocarbons. The oxides of the metals of group VI (left-hand column) and of vanadium are particularly effective, either singly or in admixture, in alumina-metal oxide composites. Coprecipitated alumina-metal oxide composites, partially dehydrated and pilled by the method of the invention, are excellent catalysts for dehydrogenating hydrocarbons. The amount of metal oxide incorporated in the composite may vary from 0.5 to 75 weight per cent based upon the weight of the composite but an amount in the range of 2 to 30 weight per cent is preferred.

The conditions of the dehydrogenation, namely, temperature, pressure, contact time and space velocity, are those commonly used in the art. These conditions do not per se form a part of my invention. Accordingly, it is unnecessary to detail conditions here. The dehydrogenation of my invention proceeds in the same general manner as in the prior art except with higher production of the desired product, greater efficiency, and greater retention of catalytic activity. The usual cycle of onstream operation followed by conventional regeneration for approximately an equal period is employed.

EXAMPLES

Following are non-limiting specific examples of the practice of the invention. In Example II the surface areas were measured by the low-temperature gas adsorption method of Brunauer, Emmett and Teller, as described for example in J. A. C. S. 60, 309 (1938).

EXAMPLE I

Granular alumina trihydrate as received from the Aluminum Company of America, made as a by-product in the manufacture of metallic aluminum and having a size of 40 to 100 mesh, was partially dehydrated by heating in a gas-fired rotary kiln. A weighed sample of the partially dehydrated material when ignited to constant weight at about 2200° F. underwent a weight loss of approximately 23 per cent. This material was ground so that approximately one-third passed through a 300-mesh screen. It was then compressed into pellets of the usual size and shape employed in catalytic operations. The pellets were immersed in an aqueous solution of chromium trioxide. They were then removed from the solution and heated at about 1000° F. for several hours to effect complete removal of both free and combined water. The catalyst so prepared contained 90 weight per cent alumina and 10 weight per cent chromia.

Normal butane was contacted, in a dehydrogenation system at 1100° F. and a space velocity of 500 gaseous volumes per volume of catalyst per hour, with the catalyst prepared as described above. The yield of normal butenes plus butadiene per pass was approximately 40 per cent.

A second catalyst was prepared by a method which was identical to that described above with the exception that commercially available pellets of activated alumina were substituted for the activated alumina prepared according to this invention. When the second catalyst was used in the normal butane dehydrogenation system under the conditions previously specified, the yield of normal butenes plus butadiene per pass was only 32 per cent.

EXAMPLE II

Alumina trihydrate, as in Example I, was partially dehydrated by heating in a gas-fired rotary kiln. A weighed sample of the partially dehydrated alumina, when ignited to constant weight at 2200° F., underwent a weight loss of approximately 23 per cent. The partially dehydrated alumina was then finely ground and was formed into pellets, which were subsequently heated at 1000° F. for 3 hours. The activated alumina pellets obtained by this procedure had a surface area of 239.0 square meters per gram, determined by low-temperature gas adsorption.

The surface areas of two different samples of commercial activated alumina pellets were measured by low-temperature gas adsorption. The first had a surface area of only 161.5 square meters per gram; the second, an area of only 112 square meters per gram.

I claim:

1. The improved method of dehydrogenating a dehydrogenatable hydrocarbon to a less saturated hydrocarbon which comprises contacting said dehydrogenatable hydrocarbon under dehydrogenating conditions with a pelleted alumina catalyst prepared by the steps of calcining hydrated alumina containing at least 28 per cent of combined water under conditions such that the resulting material when ignited to constant weight at about 2200° F. undergoes a weight loss ranging from 20 to 26 per cent, forming the resulting material into pellets, and calcining said pellets under such conditions as to remove residual water of hydration, so as to dehydrogenate said dehydrogenatable hydrocarbon to a less saturated hydrocarbon, and recovering the resulting hydrocarbon.

2. The improved method of dehydrogenating a paraffin to a corresponding less saturated aliphatic hydrocarbon which comprises contacting said paraffin under dehydrogenating conditions with a pelleted alumina catalyst prepared by the steps of calcining hydrated alumina containing at least 28 per cent of combined water under conditions such that the resulting material when ignited to constant weight at about 2200° F. undergoes a weight loss ranging from 20 to 26 per cent, forming the resulting material into pellets, and calcining said pellets under such conditions as to remove residual water of hydration, so as to dehydrogenate said paraffin to a corresponding less satuated aliphatic hydrocarbon, and recovering the resulting hydrocarbon.

3. The improved method of dehydrogenating normal butane to normal butenes and butadiene which comprises contacting said normal butane under dehydrogenating conditions with a pelleted alumina catalyst prepared by the steps of calcining hydrated alumina containing at least 28 per cent of combined water under conditions such that the resulting material when ignited to constant weight at about 2200° F. undergoes a weight loss ranging from 20 to 26 per cent, forming the resulting material into pellets, and calcining said pellets under such conditions as to remove residual water of hydration, so as to dehydrogenate said normal butane; and recovering the resulting hydrocarbon.

4. The improved method of dehydrogenating an aliphatic hydrocarbon to a corresponding less saturated aliphatic hydrocarbon which comprises contacting said aliphatic hydrocarbon under dehydrogenating conditions with pelleted alumina having incorporated therein a dehydrogenation catalyst, said pelleted alumina having been prepared by the steps of calcining hydrated alumina containing at least 28 weight per cent of combined water under such conditions that the resulting material when ignited to constant weight at about 2200° F. undergoes a weight loss in the range of 20 to 26 per cent, finely grinding the resulting material, forming the resulting finely ground material into pellets, calcining said pellets under such conditions as to remove residual combined water, so as to dehydrogenate said hydrocarbon to a corresponding less saturated aliphatic hydrocarbon, and recovering the resulting hydrocarbon.

5. The process of claim 4 in which the dehydrogenation catalyst incorporated in the alumina is a metal oxide.

6. The process of claim 4 in which the dehyrogenation catalyst incorporated in the alumina is chromium oxide.

7. The process of claim 4 in which the dehydrogenation catalyst incorporated in the alumina is molybdenum oxide.

8. The process of claim 4 in which the dehydrogenation catalyst incorporated in the alumina is vanadium oxide.

9. The improved method of dehydrogenating a paraffin to a corresponding less saturated aliphatic hydrocarbon which comprises contacting said paraffin under dehydrogenating conditions with pelleted alumina having incorporated therein a dehydrogenation catalyst, said pelleted alumina having been prepared by the steps of calcining hydrated alumina containing at least 28 weight per cent of combined water under such conditions that the resulting material when ignited to constant weight at about 2200° F. undergoes a weight loss in the range of 20 to 26 per cent, finely grinding the resulting material, forming the resulting finely ground material into pellets, calcining said pellets under such conditions as to remove residual combined water, so as to dehydrogenate said paraffin to a corresponding less saturated aliphatic hydrocarbon, and recovering the resulting hydrocarbon.

10. The process of claim 9 in which the dehydrogenation catalyst incorporated in the alumina is a metal oxide.

11. The process of claim 9 in which the dehydrogenation catalyst incorporated in the alumina is a chromium oxide.

12. The process of claim 9 in which the dehydrogenation catalyst incorporated in the alumina is a molybdenum oxide.

13. The process of claim 9 in which the dehydrogenation catalyst incorporated in the alumina is a vanadium oxide.

14. The improved method of dehydrogenating normal butane to normal butenes and butadiene which comprises contacting normal butane under dehydrogenating conditions with pelleted alumina having incorporated therein a dehydrogenation catalyst, said pelleted alumina having been prepared by the steps of calcining hydrated alumina containing at least 28 per cent of combined water under such conditions that the resulting material when ignited to constant weight at about 2200° F. undergoes a weight loss in the range of 20 to 26 per cent, finely grinding the resulting material, forming the resulting finely ground material into pellets, calcining said pellets under such conditions as to remove residual combined water, so as to dehydrogenate normal butane, and recovering the resulting hydrocarbon.

15. The process of claim 14 in which the dehydrogenation catalyst incorporated in the alumina is a metal oxide.

16. The process of claim 14 in which the dehydrogenation catalyst incorporated in the alumina is a chromium oxide.

17. The process of claim 14 in which the dehydrogenation catalyst incorporated in the alumina is a molybdenum oxide.

18. The process of claim 14 in which the dehydrogenation catalyst incorporated in the alumina is a vanadium oxide.

JAMES R. OWEN.

References Cited in the file of this patent
UNITED STATES PATENTS

| Number | Name | Date |
|---|---|---|
| 1,868,869 | Barnitt | July 26, 1932 |
| 2,277,512 | de Simo et al. | Mar. 24, 1942 |
| 2,311,979 | Corson et al. | Feb. 23, 1943 |
| 2,398,126 | Thacker et al. | Apr. 9, 1946 |
| 2,399,678 | Houdry et al. | May 7, 1946 |
| 2,402,854 | Thomas | June 25, 1946 |
| 2,469,420 | Thacker | May 10, 1949 |
| 2,487,563 | Layng | Nov. 8, 1949 |